(12) United States Patent
Higai et al.

(10) Patent No.: US 11,975,762 B2
(45) Date of Patent: May 7, 2024

(54) CRASHWORTHINESS ENERGY ABSORPTION PARTS FOR AUTOMOTIVE

(71) Applicant: JFE STEEL CORPORATION, Tokyo (JP)

(72) Inventors: Kazuhiko Higai, Tokyo (JP); Tsuyoshi Shiozaki, Tokyo (JP); Yoshikiyo Tamai, Tokyo (JP); Shigeaki Kitamura, Aichi (JP); Naoki Mabuchi, Aichi (JP)

(73) Assignee: JFE STEEL CORPORATION, Tokyo (JP)

( * ) Notice: Subject to any disclaimer, the term of this patent is extended or adjusted under 35 U.S.C. 154(b) by 405 days.

(21) Appl. No.: 17/429,101

(22) PCT Filed: Dec. 12, 2019

(86) PCT No.: PCT/JP2019/048694
§ 371 (c)(1),
(2) Date: Aug. 6, 2021

(87) PCT Pub. No.: WO2020/170569
PCT Pub. Date: Aug. 27, 2020

(65) Prior Publication Data
US 2022/0089223 A1 Mar. 24, 2022

(30) Foreign Application Priority Data

Feb. 22, 2019 (JP) .................................. 2019-030116
Oct. 18, 2019 (JP) .................................. 2019-190730

(51) Int. Cl.
*B62D 21/15* (2006.01)
*B60R 19/34* (2006.01)
*B62D 29/00* (2006.01)

(52) U.S. Cl.
CPC ............ *B62D 21/152* (2013.01); *B60R 19/34* (2013.01); *B62D 29/001* (2013.01)

(58) Field of Classification Search
CPC ......... B60R 19/24; B60R 19/26; B60R 19/34; B62D 21/15; B62D 21/152; B62D 29/001
(Continued)

(56) References Cited

U.S. PATENT DOCUMENTS 5,575,526 A * 11/1996 Wycech ............... B62D 29/002
296/187.02
6,468,613 B1 10/2002 Kitano et al.
(Continued)

FOREIGN PATENT DOCUMENTS

JP 2000-318075 A 11/2000
JP 2001-048054 A 2/2001
(Continued)

OTHER PUBLICATIONS

Effect of Various Additives on the Physical Properties of Polyvinylchloride Resin; retrieved via google search on Nov. 8, 2023. (Year: 2010).*
(Continued)

*Primary Examiner* — Jason S Daniels
(74) *Attorney, Agent, or Firm* — Oliff PLC (57) ABSTRACT

A crashworthiness energy absorption part includes: a tubular member having tensile strength of 590 to 1180 MPa grade; a closed cross section space forming wall part having tensile strength lower than the tubular member and having both edge portions joined to inner surfaces of a pair of side wall portions of the tubular member, and forming a closed cross section space between the closed cross section space forming wall part and a part of a peripheral wall portion of the tubular member; and a resin configured to fill the closed cross section space, includes a rubber-modified epoxy resin (Continued)

and a curing agent, and has tensile breaking elongation of 80% or more, adhesive strength to the tubular member and closed cross section space forming wall part of 12 MPa or higher, and a compression nominal stress of 6 MPa or higher at a compression nominal strain of 10%.

2 Claims, 5 Drawing Sheets

(58) Field of Classification Search
USPC ............... 293/133, 136; 296/187.09, 203.02
See application file for complete search history.

(56) References Cited

U.S. PATENT DOCUMENTS

| | | | |
|---|---|---|---|
| 6,821,638 B2* | 11/2004 | Obeshaw | B21C 37/154 |
| | | | 428/116 |
| 11,279,408 B2* | 3/2022 | Hirose | B62D 25/02 |
| 2002/0033618 A1* | 3/2002 | Kwon | B62D 29/001 |
| | | | 296/187.02 |
| 2006/0142403 A1 | 6/2006 | Sugiura et al. | |
| 2006/0152041 A1* | 7/2006 | Igarashi | B62D 29/001 |
| | | | 296/187.02 |
| 2010/0028651 A1 | 2/2010 | Golden et al. | |
| 2012/0315414 A1* | 12/2012 | Wesch | B62D 29/005 |
| | | | 428/34.1 |
| 2018/0029645 A1* | 2/2018 | Von Watzdorf | B62D 29/007 |
| 2022/0081033 A1* | 3/2022 | Higai | B62D 21/15 |

FOREIGN PATENT DOCUMENTS

| | | |
|---|---|---|
| JP | 2001-88740 A | 4/2001 |
| JP | 2006-240134 A | 9/2006 |
| JP | 2011-529817 A | 12/2011 |
| JP | 2017-159894 A | 9/2017 |
| JP | 2018-144529 A | 9/2018 |
| WO | 99/10168 A1 | 3/1999 |
| WO | 2004/108807 A1 | 12/2004 |
| WO | 2020/152904 A1 | 7/2020 |

OTHER PUBLICATIONS

Oct. 7, 2022 Office Action issued in European Application No. 19916530.9.
Mar. 3, 2020 Search Report issued in International Patent Application No. PCT/JP2019/048694.
Oct. 26, 2022 Office Action issued in Korean Patent Application No. 10-2021-7025348.
Dec. 9, 2021 Extended Search Report issued in European Patent Application No. 19916530.9.

* cited by examiner

CRASHWORTHINESS ENERGY ABSORPTION PARTS FOR AUTOMOTIVE

FIELD

The present invention relates to crashworthiness energy absorption parts for automotive and particularly relates crashworthiness energy absorption parts for automotive, the crashworthiness energy absorption parts being for absorbing collision energy by undergoing axis crush deformation in a longitudinal direction when a crashworthiness load is input from the front or the back of the automotive body.

BACKGROUND

There are many techniques for improving collision energy absorption performance of automobiles, such as optimization of shapes, structures, and materials, for example, of automotive parts. Furthermore, many techniques proposed in recent years achieve both improvement of collision energy absorption performance and weight reduction of automotive parts having closed cross section structures by filling the interiors of the automotive parts with resin that has been foamed (for example, foamed resin).

For example, a technique disclosed in Patent Literature 1 is for improving the bending strength and torsion stiffness of an automotive structural part with the minimum weight increase and improving the stiffness and collision safety of the automotive body by filling the interior of the automotive structural part with a foamed filler, the automotive structural part being, for example, a side sill, a floor member, or a pillar and having a structure with a closed space formed inside the structure, the closed space having been formed by placing flanges of hat-shaped cross section parts on each other with their top portions aligned with each other.

Furthermore, a technique disclosed in Patent Literature 2 is for improving the vibration isolating performance for inhibiting the transmission of vibration sound and improving the strength, stiffness, and collision energy absorption performance by fixing highly stiff foam with the compression counterforce due to the fill-up with and foaming of the highly stiff foam when the inner space of a closed cross section structure of a pillar, for example, is filled with the highly stiff foam, the pillar having hat-shaped cross section parts placed opposite to each other with their flange portions put together.

CITATION LIST

Patent Literature

Patent Literature 1: Japanese Unexamined Patent Application, Publication No. 2006-240134
Patent Literature 2: Japanese Unexamined Patent Application, Publication No. 2000-318075

SUMMARY

Technical Problem

The techniques disclosed in Patent Literature 1 and Patent Literature 2 enable improvement of the strength against bending deformation of automotive parts and the collision energy absorption performance for bending deformation due to collisions, as well as the stiffness against torsional deformation and enable prevention of deformation of the automotive parts, by filling the interiors of the automotive parts with foamed fillers or foam. However, they have a problem that the collision energy absorption performance is difficult to be improved for an automotive part, such as a front side member or a crash box to which the present invention is directed, that undergoes buckling deformation in the form of bellows and absorbs the collision energy when a crashworthiness load is input from the front or back of the automobile and the automotive part undergoes axis crush deformation, even if the technique of filling the interior of the automotive body with a foamed filler or foam is applied to the automotive part.

The present invention has been made to solve the above described problems and an object thereof is to provide a crashworthiness energy absorption part for automotive, the crashworthiness energy absorption part being, for example, a front side member or a crash box and enabling improvement of the collision energy absorption effect upon input of a crashworthiness load from the front or back of the automotive body and axis crush deformation of the crashworthiness energy absorption part in the form of bellows.

Solution to Problem

A crashworthiness energy absorption part for automotive according to a first aspect of the present invention is provided at the front or back of an automotive body and being for absorbing collision energy by undergoing axis crush deformation when a crashworthiness load is input from the front or back of the automotive body, and includes: a tubular member formed of a steel sheet having tensile strength of 590 to 1180 MPa grade, the tubular member including a top portion and a pair of side wall portions continuous with the top portion; a closed cross section space forming wall part formed of a steel sheet having tensile strength lower than the tubular member and provided to extend over the top portion inside the tubular member, the closed cross section space forming wall part having both edge portions joined to inner surfaces of the pair of side wall portions, and forming a closed cross section space between the closed cross section space forming wall part and a part of a peripheral wall portion of the tubular member; and a resin configured to fill the closed cross section space, wherein the resin includes a rubber-modified epoxy resin and a curing agent, and the resin has tensile breaking elongation of 80% or more, adhesive strength to the tubular member and closed cross section space forming wall part of 12 MPa or higher, and a compression nominal stress of 6 MPa or higher at a compression nominal strain of 10%.

A crashworthiness energy absorption part for automotive according to a second aspect of the present invention is provided at the front or back of an automotive body and being for absorbing collision energy by undergoing axis crush deformation when a crashworthiness load is input from the front or back of the automotive body, and includes: a tubular member formed of a steel sheet having tensile strength of 590 to 1180 MPa grade, the tubular member including a top portion and a pair of side wall portions continuous with the top portion; a closed cross section space forming wall part formed of a steel sheet having tensile strength lower than the tubular member and provided to extend over the top portion inside the tubular member, the closed cross section space forming wall part having both edge portions joined to inner surfaces of the pair of side wall portions, and forming a closed cross section space between the closed cross section space forming wall part and a part of a peripheral wall portion of the tubular member; and a resin configured to fill the closed cross section space, wherein the resin includes a rubber-modified epoxy resin, and the resin has tensile breaking elongation of 80% or more, adhesive strength to the tubular member and closed cross section space forming wall part of 12 MPa or higher, and a compression nominal stress of 6 MPa or higher at a compression nominal strain of 10%.

Advantageous Effects of Invention

The present invention enables repeated buckling deformation in the form of bellows without reducing the deformation resistance of a tubular member in the process of axis crush deformation of the tubular member when a crashworthiness load is input from the front or back of the automotive body and thus enables improvement of the collision energy absorption effect.

DESCRIPTION OF EMBODIMENTS

A crashworthiness energy absorption part for automotive according to an embodiment of the present invention will be described below on the basis of FIG. 1 and FIG. 2. Redundant explanation of any elements having substantially the same functions and configurations will be omitted by assigning the same reference sign to the elements, in this specification and the drawings.

Figure 1:
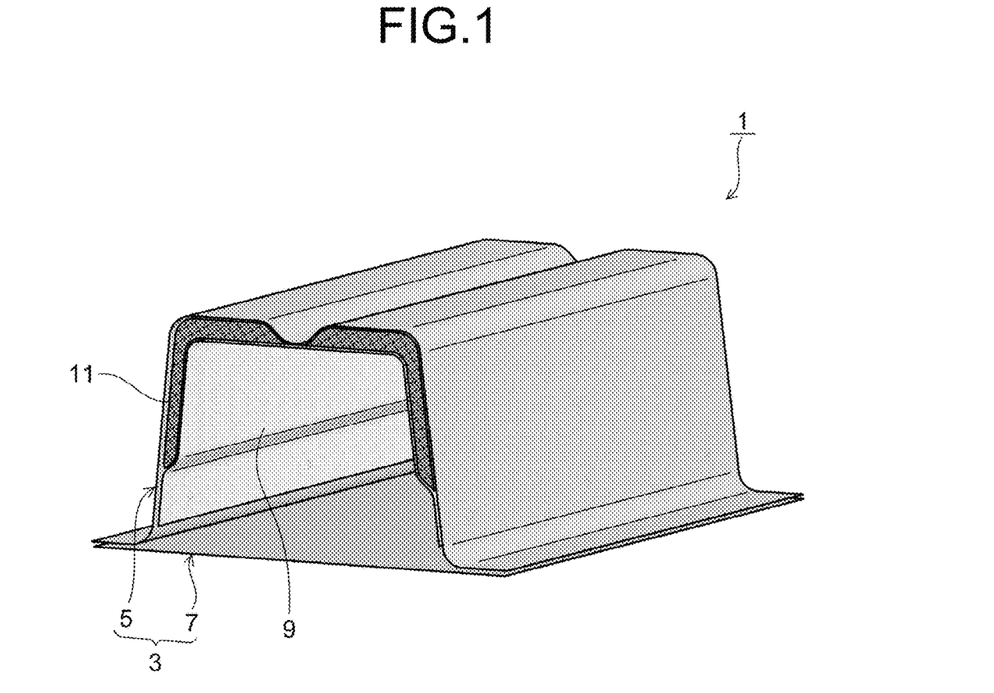
FIG. 1 is an explanatory diagram illustrating a configuration of a crashworthiness energy absorption part for automotive, according to an embodiment of the present invention.

A crashworthiness energy absorption part 1 for automotive according to an embodiment includes, as illustrated in FIG. 1: a tubular member 3 formed of an outer part 5 and an inner part 7; a closed cross section space forming wall part 9 that is provided at a front portion or a back portion of an automotive body, absorbs collision energy when a crashworthiness load is input from the front or back of the automotive body, and forms a closed cross section space between the outer part 5 and the closed cross section space forming wall part 9, the outer part 5 being a part of a peripheral wall portion of the tubular member 3; and a resin 11 that fills a cross section of the closed cross section space.

Tubular Member

Figure 2:
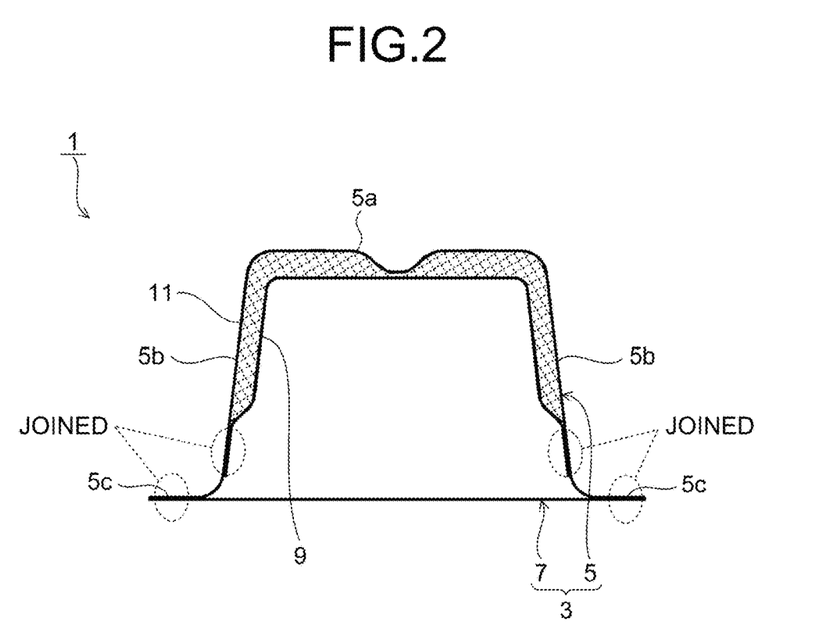
FIG. 2 is a sectional view of the crashworthiness energy absorption part for automotive, according to the embodiment.

The tubular member 3 undergoes axis crush deformation to absorb collision energy, has a top portion 5a and a pair of side wall portions 5b continuous with the top portion 5a, and as illustrated in FIG. 2, has been formed in a tube-shape by joining between flange portions 5c of the outer part 5 and both edge portions of the inner part 7, the outer part 5 being formed of the top portion 5a, the side wall portions 5b, and the flange portions 5c and having a hat-shaped cross section, the inner part 7 having a flat sheet shape.

The outer part 5 and inner part 7 forming the tubular member 3 are both made of a steel sheet having tensile strength of the 590 MPa grade or higher and the 1180 MPa grade or lower. Examples of the type of the steel sheet include a cold rolled steel sheet, a hot rolled steel sheet, a zinc-based coating steel sheet, a zinc alloy coating steel sheet, and an aluminum alloy coating steel sheet.

The tubular member 3 is used as an automotive part having a closed cross section structure, like front side members that extend along the front-back direction of an automotive body at front left and right positions of the automotive body and form a part of an automotive frame member, or a crash box provided at a front end or back end of the automotive frame member, and this automotive part is installed in the automotive body such that an axial direction (a longitudinal direction) of the tubular member 3 is aligned with the front-back direction of the automotive body.

Closed Cross Section Space Forming Wall Part

The closed cross section space forming wall part 9 is a member that is formed of a steel sheet having tensile strength lower than that of the tubular member 3, is provided to extend over the top portion 5a between the outer part 5 and the inner part 7 inside the tubular member 3 as illustrated in FIG. 2, and has an approximately U-shaped cross section; both edge portions of the closed cross section space forming wall part 9 are joined to the pair of side wall portions 5b of the outer part 5; and the closed cross section space forming wall part 9 forms a closed cross section space between the closed cross section space forming wall part 9, and the top portion 5a and side wall portions 5b of the outer part 5 that is a part of the peripheral wall portion of the tubular member 3.

Both edge portions of the closed cross section space forming wall part 9 and the side wall portions 5b are joined to each other by, for example, spot welding. Furthermore, the closed cross section space formed between the closed cross section space forming wall part 9 and the outer part 5 is a space having a shape with a closed cross section along a direction intersecting the axial direction of the tubular member 3 illustrated in FIG. 1, the space having the closed cross section formed continuously along the axial direction of the tubular member 3.

Resin

The resin 11 fills the closed cross section space formed between the closed cross section space forming wall part 9 and the outer part 5.

The resin 11 includes a rubber-modified epoxy resin and a curing agent, and is able to be adhered to the outer part 5 and the closed cross section space forming wall part 9 due to the adhesive capacity of the resin 11 itself by performing a heat treatment at a predetermined temperature for a predetermined time period. Furthermore, the resin 11 has properties including tensile breaking elongation of 80% or more, adhesive strength to the tubular member 3 and closed cross section space forming wall part 9 of 12 MPa or higher, and a compression nominal stress of 6 MPa or higher at a compression nominal strain of 10%. Each of these properties is a value after the heat treatment of the resin 11.

Values of the tensile breaking elongation, adhesive strength, and compression nominal stress may be found by the following methods, respectively.

Tensile Breaking Elongation

Uncured resin is placed between two steel sheets adjusted to have a predetermined gap therebetween and is thermally cured under predetermined conditions, the steel sheets are peeled off to make flat sheet shaped resin, and the flat sheet shaped resin is processed into a predetermined shape to make a test piece. Subsequently, a tensile test is performed at a predetermined tensile speed until the resin breaks and elongation between marked lines at the time of breakage of the resin is measured. The tensile breaking elongation is a value expressed in percentage, the value being obtained by dividing the measured elongation between marked lines at the time of breakage of the resin by the initial distance between marked lines.

Adhesive Strength

Uncured resin is placed between two steel sheets adjusted to have a predetermined gap therebetween and is thermally cured under predetermined conditions to make a test piece. Subsequently, a tensile test for the test piece is performed at a predetermined tensile speed to measure a load at the time of breakage of the steel sheets and resin. The adhesive strength is a value (=shearing adhesive strength) obtained by dividing the measured load at the time of breakage by the adhesive area between the steel sheets and the resin.

Compression Nominal Stress

Uncured resin is placed between two steel sheets adjusted to have a predetermined gap therebetween and is thermally cured under predetermined conditions, and the steel sheets are peeled off to make flat sheet shaped resin. Subsequently, the flat sheet shaped resin is cut out into a cylindrical shape to make a test piece. The compression nominal stress is a value obtained by dividing a load at the time of compression of the test piece at a predetermined test speed up to a nominal strain of 10% by the initial cross sectional area of the test piece, with the circular surface of the test piece being a compression surface.

The reasons for prescribing the type and properties of the resin 11 as described above in the crashworthiness energy absorption part 1 for automotive according to the embodiment are as follows. Firstly, because the resin 11 includes a rubber-modified epoxy resin and a curing agent and the resin 11 is thermally cured by a heat treatment to be adhered to the tubular member 3 and closed cross section space forming wall part 9 at adhesive strength of 12 MPa or higher when a crashworthiness load is input to the tubular member 3 and the tubular member 3 undergoes axis crush deformation in the form of bellows, the resin 11 is able to be deformed following the deformation of the tubular member 3.

By having the tensile breaking elongation of 80% or more, the resin 11 itself is prevented from breaking when the resin 11 is deformed following the axis crush deformation of the tubular member 3.

By having the adhesive strength of 12 MPa or higher, the resin 11 is prevented from being peeled off from the tubular member 3 and closed cross section space forming wall part 9 in the axis crush deformation process of the tubular member 3 and reduction of the buckling resistance and deformation resistance is thus prevented.

By having the compression nominal stress of 6 MPa or higher at the compression nominal strain of 10%, the resin 11 is able to have enough yield strength to prevent the resin 11 itself from being crushed and broken even if the tubular member 3 is deformed in the form of bellows in the axis crush deformation process.

The temperature and time period for the heat treatment, in addition to the types and compositions of the rubber-modified epoxy resin and curing agent may be adjusted as appropriate such that the tensile breaking elongation, adhesive strength, and compression nominal stress of the resin 11 will be in the above described ranges.

The curing agent may be a curing agent optimally selected depending on the environment of usage and reaction temperature, for example, such as a polyamine (an aliphatic polyamine, an aromatic amine, an aromatic polyamine, or a polyamidoamine), an acid anhydride curing agent, a phenol-based curing agent, a thiol-based curing agent, dicyandiamide that is a latent curing agent, an imidazole compound, a ketimine compound, or an organic acid hydrazide.

The above described crashworthiness energy absorption part 1 for automotive according to the embodiment enables the buckling resistance to be improved without the resin 11 being peeled off from the tubular member 3 and closed cross section space forming wall part 9 in the process in which the tubular member 3 undergoes axis crush deformation by input of a crashworthiness load to the tubular member 3, enables repeated buckling of the tubular member 3 in the form of bellows without reduction in deformation resistance of the tubular member 3, and enables the collision energy absorption performance to be improved.

According to the above description, the resin 11 includes the rubber-modified epoxy resin and curing agent after the heat treatment. However, depending on the amount of the curing agent filling the closed cross section space formed between the closed cross section space forming wall part 9 and the outer part 5, the curing agent may be not remaining or not detected in the resin 11 that has been heat-treated at the predetermined temperature for the predetermined time period.

Therefore, in another aspect of the crashworthiness energy absorption part 1 for automotive according to the embodiment of the present invention, the resin 11 that has been heat-treated may have no curing agent included or detected therein and may be adhered to the outer part 5 and the closed cross section space forming wall part 9 due to the adhesive capacity of the resin 11 itself by a heat treatment at a predetermined temperature for a predetermined time period.

In the case where the heat-treated resin 11 has no curing agent included or detected therein, the resin 11 also has properties including tensile breaking elongation of 80% or more, adhesive strength to the tubular member 3 and closed cross section space forming wall part 9 of 12 MPa or higher, and a compression nominal stress of 6 MPa or higher at a compression nominal strain of 10%. The temperature and time period for the heat treatment, in addition to the types and compositions of the rubber-modified epoxy resin and curing agent to fill the closed cross section space before the heat treatment may be adjusted as appropriate such that the tensile breaking elongation, adhesive strength, and compression nominal stress of the resin 11 will be in the above described ranges.

If the properties of the resin 11 including the rubber-modified epoxy resin and having no curing agent included or detected therein are in the above ranges, the buckling resistance is able to be improved without the resin 11 being peeled off from the tubular member 3 and closed cross section space forming wall part 9 in the process in which the tubular member 3 undergoes axis crush deformation by input of a crashworthiness load to the tubular member 3, the tubular member 3 is able to undergo repeated buckling in the form of bellows without reduction in deformation resistance of the tubular member 3, and the collision energy absorption performance is able to be improved.

EXAMPLES

Experiments for confirming effects of crashworthiness energy absorption parts for automotive according to the present invention were conducted and results of these experiments will thus be described below.

Figure 3:
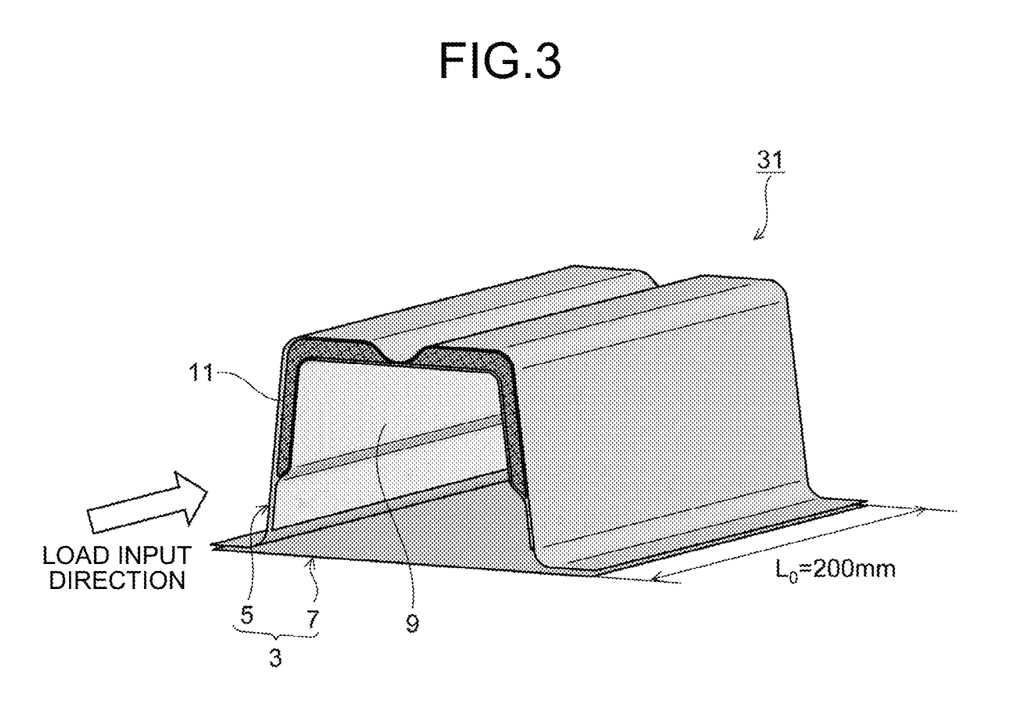
FIG. 3 is a diagram for explanation of an axis crush deformation test method for crashworthiness energy absorption parts for automotive in examples.

In the experiments, axis crush deformation tests were conducted for test specimens that are crashworthiness energy absorption parts for automotive according to the present invention; and in the axis crush deformation tests, as illustrated in FIG. 3, load-stroke curves each indicating a relation between loads and the amount of axis crush deformation (strokes) when a test specimen length (an axial direction length $L_0$ of a test specimen 31) was caused to undergo axis crush deformation by 80 mm from 200 mm to 120 mm by input of a load in an axial direction of the test specimen 31 at a test speed of 17.8 m/s were measured and images of states of the deformation were captured by a high-speed camera. Furthermore, absorbed energy for strokes from 0 mm to 80 mm was found from the measured load-stroke curve.

Figure 4:
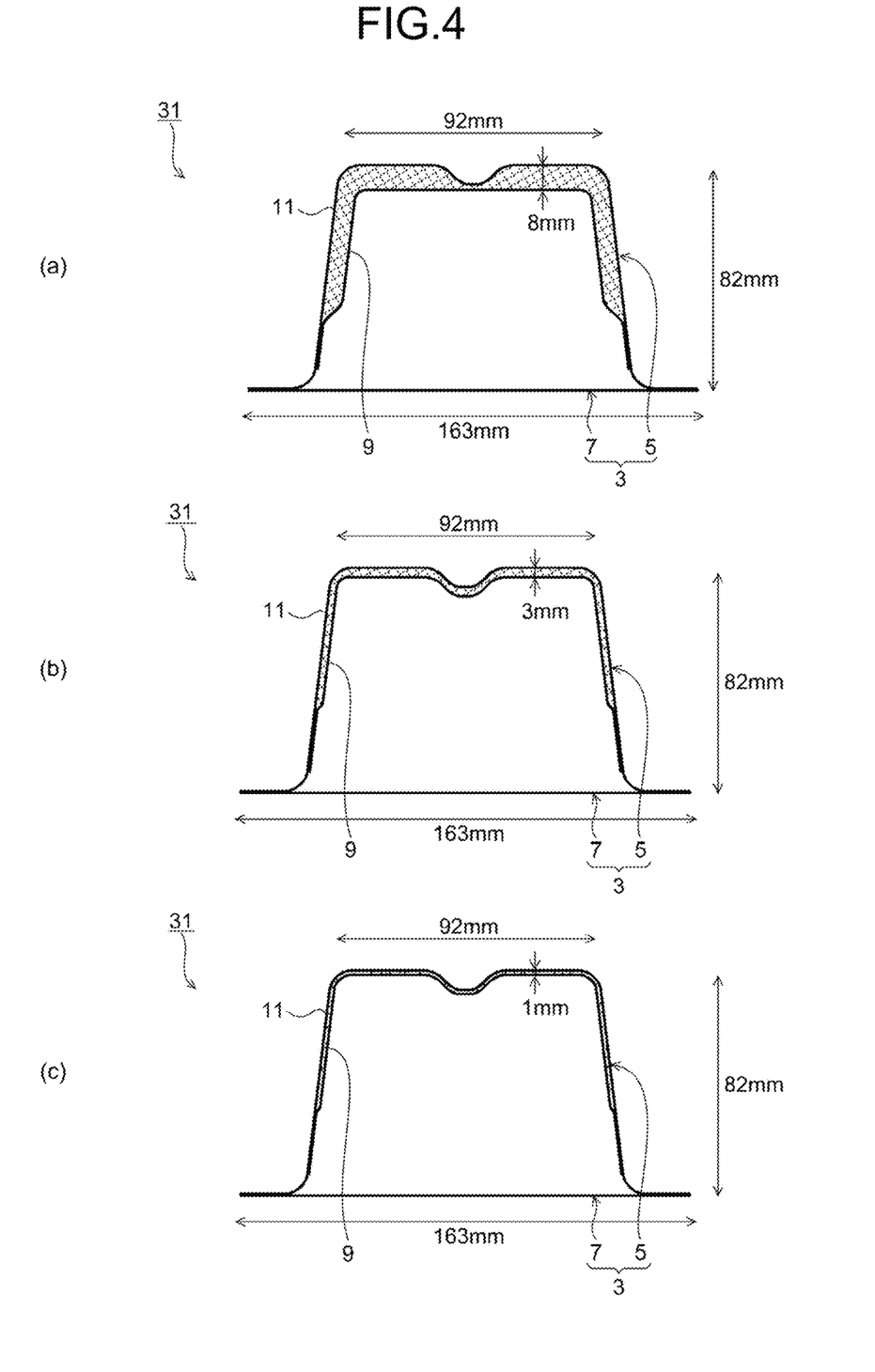
FIG. 4 is a diagram illustrating structures of test specimens used in axis crush deformation tests in the examples (invention examples).

FIG. 4 illustrates structures and shapes of test specimens 31 in invention examples. In the invention examples, axis crush deformation tests were performed on the test specimens 31 that were crashworthiness energy absorption parts 1 for automotive (FIG. 1 and FIG. 2) according to the above described embodiment of the present invention. The test specimens 31 each have the tubular member 3 having the outer part 5 and the inner part 7 that have been joined together by spot welding, the closed cross section space has been formed between the outer part 5 and the closed cross section space forming wall part 9, and the entire region of the closed cross section space has been filled with the resin 11. Heights of the spaces between the outer parts 5 and the closed cross section space forming wall parts 9 were 1 mm, 3 mm, and 8 mm ((a) to (c) in FIG. 4).

A steel sheet having tensile strength of the 590 MPa grade to the 1180 MPa grade and a sheet thickness of 1.2 mm or 1.4 mm was used for the outer part 5, and a steel sheet having tensile strength of the 590 MPa grade and a sheet thickness of 1.2 mm was used for the inner part 7. Furthermore, a steel sheet having tensile strength of the 270 MPa grade and a sheet thickness of 0.5 mm was used for the closed cross section space forming wall part 9.

The resin 11 was obtained by a heat treatment of a rubber-modified epoxy resin and a curing agent at a predetermined heating temperature for a predetermined heating time period, and values of the tensile breaking elongation, adhesive strength, and compression nominal stress for the heat-treated resin 11 were in the ranges of the present invention. The tensile breaking elongation, adhesive strength, and compression nominal stress were found by separately performing the following test methods respectively.

Tensile Breaking Elongation

A gap between two steel sheets was adjusted to be 2 mm, uncured resin was put between the two steel sheets and thermally cured under a condition where the temperature was held at 180° C. for 20 minutes, and flat sheet shaped resin having a thickness of 2 mm was made by peeling the steel sheets off. Subsequently, the flat sheet shaped resin was processed into a dumbbell shape (JIS No. 6 Dumbbell) to make a test piece, a tensile test was performed until the resin broke at a tensile speed of 2 mm/min to measure elongation between marked lines at the time of breakage of the resin. A value obtained by dividing the measured elongation between marked lines at the time of breakage of the resin by the initial distance between marked lines (=20 mm), the value being expressed in percentage, was found as the tensile elongation at break.

Shearing Adhesive Strength

Figure 5:
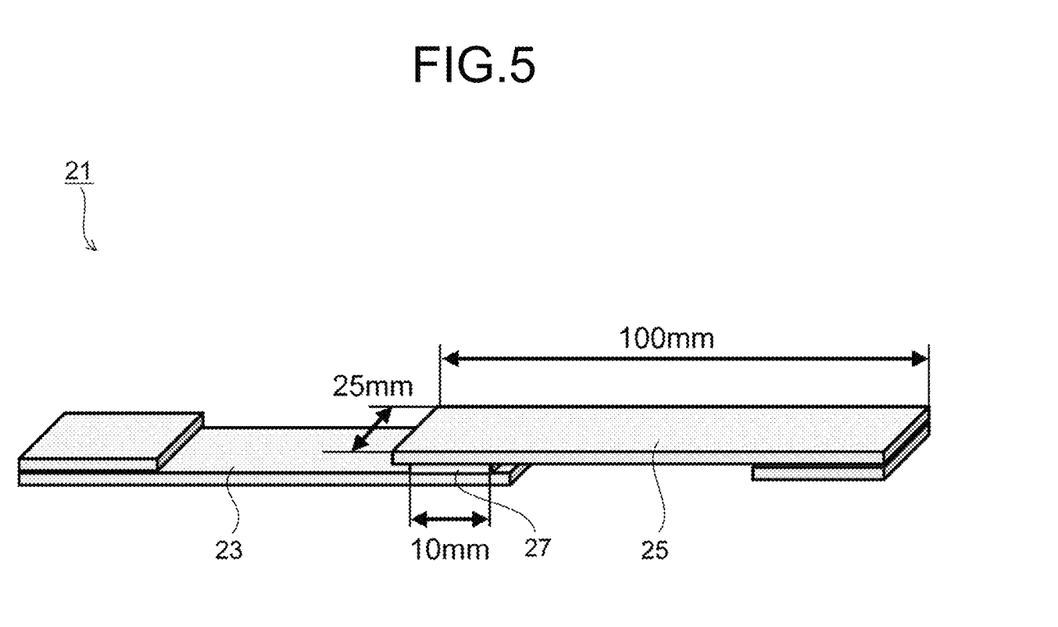
FIG. 5 is a diagram for explanation of an adhesive strength measuring method in the examples.

As illustrated in FIG. 5, a test piece 21 has: an adherend 23 and an adherend 25 that are steel sheets (SPCC) each having a width of 25 mm, a thickness of 1.6 mm, and a length of 100 mm; and uncured resin 27 placed at an adhesive portion (with a width of 25 mm and a length of 10 mm) and thermally cured under a condition where the temperature was held at 180° C. for 20 minutes with the resin 27's thickness adjusted to 0.15 mm. Subsequently, a tensile test was conducted for the test piece 21 until the adherend 23 or adherend 25 and the resin 27 were broken at a tensile speed of 5 mm/min to measure the load at the time of breakage. A value obtained by dividing this load at the time of breakage by the area of the adhesive portion (the adhesive area: the width, 25 mm×the length, 10 mm) was found as the shearing adhesive strength.

Compression Nominal Stress

A gap between two steel sheets was adjusted to be 3 mm, uncured resin was put between the two steel sheets and thermally cured under a condition where the temperature was held at 180° C. for 20 minutes, and a flat sheet shaped resin test piece having a thickness of 3 mm was made by peeling the steel sheets off. Subsequently, a test piece was cut out in a cylindrical shape having a diameter of 20 mm from the flat sheet shaped resin test piece. A value obtained by dividing a load by the initial cross sectional area of the test piece was found as the compression nominal stress, the load being that at the time when the test piece had been compressed at a test speed of 2 mm/min up to a nominal strain of 10%, with a circular surface being a compression surface, the circular surface being that of the test piece and having a diameter of 20 mm.

Figure 6:
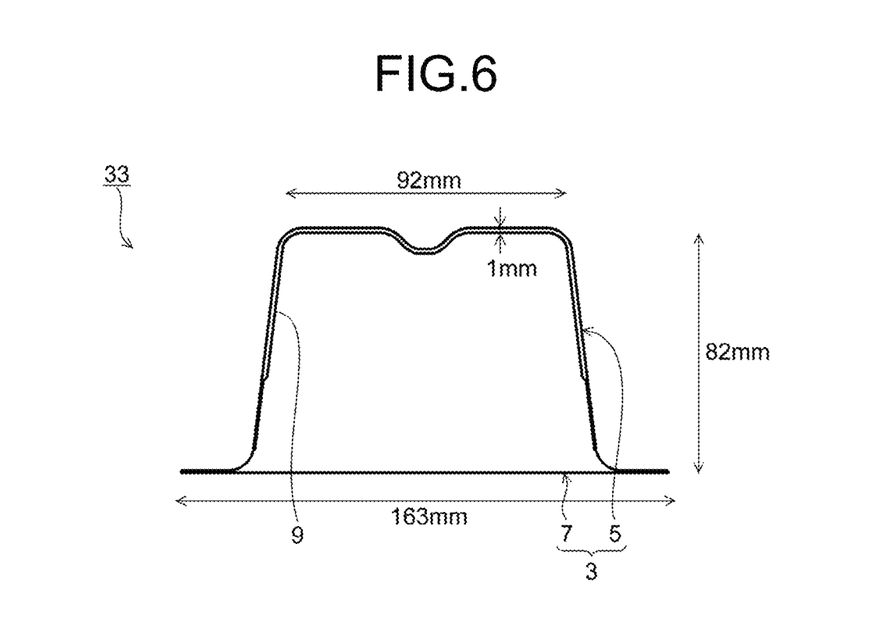
FIG. 6 is a diagram illustrating a structure of test specimens used in axis crush deformation tests in the examples (comparative examples).

In the examples, axis crush deformation tests were conducted for comparative examples, similarly to the invention examples, the comparative examples corresponding to a case where a test specimen 33 (FIG. 6) having a tubular member and a closed cross section space forming wall part with the same shapes as the tubular member 3 and closed cross section space forming wall part 9 of the invention examples was used, the test specimen 33 not having been filled with resin, and a case where properties of a resin 11 in a test specimen 31 having the same shape as that of the invention examples are outside the ranges of the present invention. Table 1 shows conditions, including structures, types of resins, tensile breaking elongation, adhesive strength, and compression nominal stresses at the compression nominal strain of 10%, for the test specimens corresponding to the invention examples and comparative examples.

TABLE 1

| | Structure | | | | | | Resin | | | | | | | Absorbed energy | | Weight of test specimen [kg] |
|---|---|---|---|---|---|---|---|---|---|---|---|---|---|---|---|---|
| | Outer part | | Closed cross section space forming wall part | | Inner part | | | | | Presence of curing agent after heat treatment | Tensile breaking elongation [%] | Adhesive strength [MPa] | Compression nominal stress [MPa] | test velocity 17.8 m/s | | |
| | Material [MPa] | Sheet thickness [mm] | Material [MPa] | Sheet thickness [mm] | Material [MPa] | Sheet thickness [mm] | Presence | Type of resin | Type of curing agent | | | | | [kJ] | [kJ/kg] | |
| First invention example | 590 | 1.2 | 270 | 0.5 | 590 | 1.2 | Yes | Rubber-modified epoxy | Aliphatic polyamine | Yes | 80 | 12 | 6 | 13.1 | 10.2 | 1.28 |
| Second invention example | 590 | 1.2 | 270 | 0.5 | 590 | 1.2 | Yes | Rubber-modified epoxy | Aromatic polyamine | Yes | 100 | 13 | 8 | 9.8 | 8.5 | 1.12 |
| Third invention example | 1180 | 1.2 | 270 | 0.5 | 590 | 1.2 | Yes | Rubber-modified epoxy | Dicyandiamide | Yes | 100 | 14 | 8 | 12.6 | 11.2 | 1.13 |
| Fourth invention example | 590 | 1.2 | 270 | 0.5 | 590 | 1.2 | Yes | Rubber-modified epoxy | Organic acid hydrazide | Yes | 90 | 14 | 7 | 10.1 | 8.5 | 1.19 |
| Fifth invention example | 590 | 1.2 | 270 | 0.5 | 590 | 1.2 | Yes | Rubber-modified epoxy | Dicyandiamide | No | 85 | 13 | 6 | 13.1 | 10.2 | 1.28 |
| Sixth invention example | 1180 | 1.2 | 270 | 0.5 | 590 | 1.2 | Yes | Rubber-modified epoxy | Imidazole | No | 110 | 14 | 8 | 12.6 | 11.2 | 1.12 |
| Seventh invention example | 590 | 1.2 | 270 | 0.5 | 590 | 1.2 | Yes | Rubber-modified epoxy | Aromatic polyamine | No | 100 | 14 | 7 | 10.1 | 8.5 | 1.19 |
| First comparative example | 590 | 1.2 | 270 | 0.5 | 590 | 1.2 | No | — | — | — | — | — | — | 6.5 | 6.1 | 1.06 |
| Second comparative example | 590 | 1.4 | 270 | 0.5 | 590 | 1.2 | No | — | — | — | — | — | — | 7.0 | 6.0 | 1.17 |
| Third comparative example | 980 | 1.2 | 270 | 0.5 | 590 | 1.2 | No | — | — | — | — | — | — | 8.1 | 7.6 | 1.06 |
| Fourth comparative example | 1180 | 1.2 | 270 | 0.5 | 590 | 1.2 | No | — | — | — | — | — | — | 8.5 | 7.9 | 1.07 |
| Fifth comparative example | 590 | 1.2 | 270 | 0.5 | 590 | 1.2 | Yes | Epoxy | — | — | 2 | 26 | 55 | 7.6 | 6.9 | 1.11 |
| Sixth comparative example | 590 | 1.2 | 270 | 0.5 | 590 | 1.2 | Yes | Urethane | — | — | 2 | 10 | 10 | 7.3 | 6.6 | 1.10 |
| Seventh comparative example | 590 | 1.2 | 270 | 0.5 | 590 | 1.2 | Yes | Urethane | — | — | 15 | 4 | 4 | 7.1 | 6.5 | 1.09 |

In each of a first invention example to a seventh invention example shown in Table 1, the tensile strength (the 590 MPa grade or higher and 1180 MPa grade or lower) of steel sheets used for the outer part 5 and inner part 7 forming the tubular member 3, the tensile strength (the 270 MPa grade) of a steel sheet used for the closed cross section space forming wall part 9, the type of the resin 11, the tensile breaking elongation, the adhesive strength, and the compression nominal stress were all in the ranges of the present invention described already with respect to the embodiment.

The first invention example to the fourth invention example each had the curing agent remaining in the resin 11 after the heat treatment at the predetermined heating temperature for the predetermined heating time period. Furthermore, the fifth invention example to the seventh invention example each had less of the curing agent than the first to fourth invention examples, and had no curing agent remaining or detected in the resin 11 after the heat treatment at the predetermined heating temperature for the predetermined heating time period.

In contrast, in each of a first comparative example to a fourth comparative example, a test specimen 33 not filled with resin was used, and in each of a fifth comparative example to a seventh comparative example, a test specimen 31 in which the type of the resin 11 was epoxy or urethane and at least one of the tensile breaking elongation, adhesive strength, and compression nominal stress was outside the range of the present invention was used.

Figure 7:
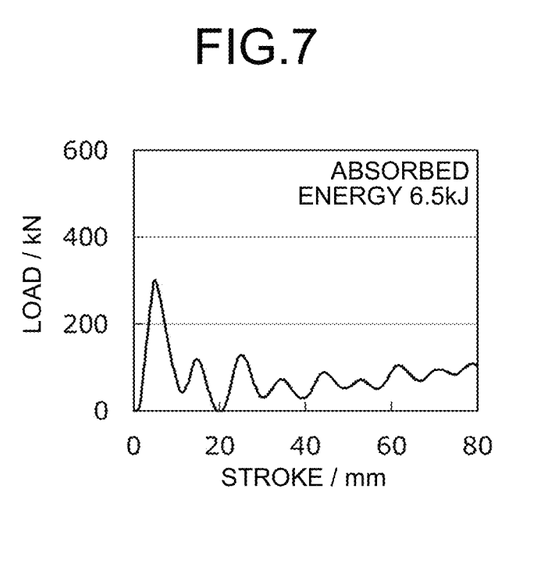
FIG. 7 is a diagram illustrating results of measurement of crashworthiness loads and the amount of axis crush deformation (strokes) in an axis crush deformation test for a test specimen that is a crashworthiness energy absorption part for automotive according to a comparative example in the examples.
Figure 8:
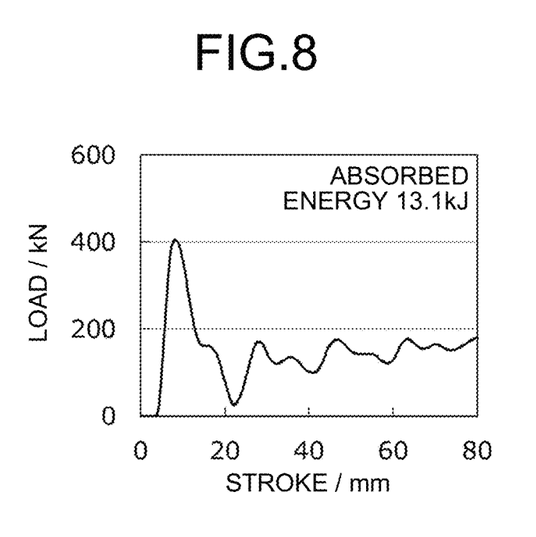
FIG. 8 is a diagram illustrating results of measurement of crashworthiness loads and the amount of axis crush deformation (strokes) in an axis crush deformation test for a test specimen that is a crashworthiness energy absorption part for automotive according to an invention example in the examples.

FIG. 7 and FIG. 8 respectively illustrate results of measurement of load-stroke curves when axis crush deformation tests were conducted using the test specimen 33 according to the first comparative example and the test specimen 31 according to the first invention example. FIG. 7 and FIG. 8 are each a load-stroke curve in which the horizontal axis corresponds to a stroke (mm) representing a deformation amount of the test specimen in the axial direction from the start of a collision and the vertical axis corresponds to a load (kN) input to the test specimen. The absorbed energy written in each graph is the absorbed amount of collision energy at strokes from 0 mm to 80 mm.

FIG. 7 illustrates results in the first comparative example for the test specimen 33 (FIG. 6) not filled with resin, the load input to the test specimen 33 has the largest value (about 300 kN) immediately after the start of input, and the values of loads thereafter changed along with buckling of the peripheral wall portion of the tubular member 3. The absorbed energy at the end of the test when the stroke reached 80 mm was 6.5 kJ.

FIG. 8 illustrates results in the first invention example for the test specimen 31 in which the closed cross section space formed between the outer part 5 and the closed cross section space forming wall part 9 is filled with the resin 11 and the tensile breaking elongation (=80%), the adhesive strength (=12 MPa), and the compression nominal stress (=6 MPa) at the compression nominal strain of 10% were all in the ranges of the present invention. From the load-stroke curve illustrated in FIG. 8, the maximum load immediately after the start of input of the load was about 400 kN which was a significant improvement from the first comparative example described above. Furthermore, the deformation loads from and after the stroke of 10 mm stably remained at higher values than those in the first comparative example. The absorbed energy at the strokes from 0 mm to 80 mm was 13.1 kJ which was also a significant improvement from the first comparative example.

Accordingly, it was found that in the first invention example, by having the space between the outer part 5 and the closed cross section space forming wall part 9 filled with the resin 11 and having the tensile breaking elongation, the adhesive strength, and the compression nominal stress in the ranges of the present invention, the buckling strength increased and the deformation resistance increased without the resin 11 being peeled off in the process of axis crush deformation, compression deformation in the form of bellows occurred, and the collision energy absorption performance improved.

Next, axis crush deformation tests were conducted with the structures, types of resins, and adhesive strength of the test specimens used in the axis crush deformation tests changed, and results of measurement of the absorbed energy at the strokes from 0 mm to 80 mm and the weights of the test specimens are shown in Table 1 above.

The weight of a test specimen in Table 1 is the sum of weights of the outer part 5, inner part 7, closed cross section space forming wall part 9, and resin 11, for the test specimens 31 filled with the resins 11. For the test specimens 33 not filled with resin, the weight of a test specimen in Table 1 is the sum of weights of the outer part 5, inner part 7, and closed cross section space forming wall part 9.

As illustrated in FIG. 8 described above, the absorbed energy in the first invention example was 13.1 kJ which was a significant improvement from the absorbed energy of 6.5 kJ in the first comparative example. Furthermore, the absorbed energy in the first invention example was also a significant improvement even when compared with the absorbed energy (=8.5 kJ) in the fourth comparative example where a steel sheet (the 1180 MPa grade) having tensile strength higher than that in the first comparative example was used for the outer part 5.

The weight of the test specimen in the first invention example was 1.28 kg, and was larger than the weight of the test specimen (=1.06 kg) in the first comparative example not filled with resin. However, the absorbed energy per unit weight obtained by dividing the absorbed energy by the weight of the test specimen was 10.2 kJ/kg in the first invention example and this was an improvement from the first comparative example (=6.1 kJ/kg).

In the second invention example, a test specimen 31 ((c) in FIG. 4) in which the resin 11 had a thickness of 1 mm that is less than that of the first invention example was used. The absorbed energy in the second invention example was 9.8 kJ which was a significant improvement from the first comparative example (=6.5 kJ). Furthermore, the weight of the test specimen in the second invention example was 1.12 kg that was less than that in the first invention example. The absorbed energy per unit weight in the second invention example was 8.5 kJ/kg which was an improvement from the first comparative example (=6.1 kJ/kg).

In the third invention example, a test specimen 31 ((c) in FIG. 4) in which the steel sheet used for the outer part 5 had tensile strength of the 1180 MPa grade and the resin 11 had a thickness of 1 mm was used. The absorbed energy in the third invention example was 12.6 kJ which was a significant improvement from the fourth comparative example (=8.5 kJ). Furthermore, the weight of the test specimen in the third invention example was 1.13 kg that was less than that in the first invention example. In addition, the absorbed energy per unit weight in the third invention example was 11.2 kJ/kg that was an improvement from the fourth comparative example (=7.9 kJ/kg).

In the fourth invention example, a test specimen 31 ((b) in FIG. 4) in which the steel sheet used for the outer part 5 had tensile strength of the 590 MPa grade and the resin 11 had a thickness of 3 mm was used. The absorbed energy in the fourth invention example was 10.1 kJ which was a significant improvement when compared with the first comparative example (=6.5 kJ). Furthermore, the weight of the test specimen in the fourth invention example was 1.19 kg that was less than that in the first invention example. The absorbed energy per unit weight in the fourth invention example was 8.5 kJ/kg which was an improvement from the first comparative example (=6.1 kJ/kg).

In the fifth invention example, a test specimen 31 ((a) in FIG. 4) in which the steel sheet used for the outer part 5 had tensile strength of the 590 MPa grade and the resin 11 had a thickness of 8 mm was used. The absorbed energy in the fifth invention example was 13.1 kJ which was a significant improvement as compared to the absorbed energy of 6.5 kJ in the first comparative example. Furthermore, the absorbed energy in the fifth invention example was also a significant improvement even when compared with the absorbed energy (=8.5 kJ) in the fourth comparative example where a steel sheet (1180 MPa grade) having tensile strength higher than that in the first comparative example was used for the outer part 5.

In the sixth invention example, a test specimen 31 ((c) in FIG. 4) in which the steel sheet used for the outer part 5 had tensile strength of the 1180 MPa grade and the resin 11 had a thickness of 1 mm was used. The absorbed energy in the sixth invention example was 12.6 kJ which was a significant improvement from the fourth comparative example (=8.5 kJ). Furthermore, the weight of the test specimen in the sixth invention example was 1.12 kg that was less than that in the first invention example. In addition, the absorbed energy per unit weight in the sixth invention example was 11.2 kJ/kg that was an improvement from the fourth comparative example (=7.9 kJ/kg).

In the seventh invention example, a test specimen 31 ((b) in FIG. 4) in which the steel sheet used for the outer part 5 had tensile strength of the 590 MPa grade and the resin 11 had a thickness of 3 mm was used. The absorbed energy in the seventh invention example was 10.1 kJ which was a significant improvement when compared with the first comparative example (=6.5 kJ). Furthermore, the weight of the test specimen in the seventh invention example was 1.19 kg that was less than that in the first invention example. The absorbed energy per unit weight in the seventh invention example was 8.5 kJ/kg which was an improvement from the first comparative example (=6.1 kJ/kg).

In the first comparative example, the test specimen 33 (FIG. 6) not filled with resin was used, and the weight of the test specimen was 1.06 kg. The absorbed energy was 6.5 kJ as illustrated in FIG. 7 described above, and the absorbed energy per unit weight was 6.1 kJ/kg.

In the second comparative example, a steel sheet having a sheet thickness of 1.4 mm was used for the outer part 5 in a test specimen 33 having the same shape as that in the first comparative example, and the weight of the test specimen was 1.17 kg. The absorbed energy in the second comparative example was 7.0 kJ, the absorbed energy per unit weight was 6.0 kJ/kg, and although the absorbed energy was more than that in the first comparative example, the absorbed energy was not as much as those in the first to seventh invention examples.

In the third comparative example, a steel sheet having tensile strength of the 980 MPa grade was used for the outer part 5 in a test specimen 33 having the same shape as that in the first comparative example, and the weight of the test specimen was 1.06 kg. The absorbed energy in the third comparative example was 8.1 kJ, the absorbed energy per unit weight was 7.6 kJ/kg, and although the absorbed energy was more than that in the first comparative example, the absorbed energy was not as much as those in the first to seventh invention examples.

In the fourth comparative example, a steel sheet having tensile strength of the 1180 MPa grade was used for the outer part 5 in a test specimen 33 having the same shape as that in the first comparative example, and the weight of the test specimen was 1.07 kg. The absorbed energy in the fourth comparative example was 8.5 kJ, the absorbed energy per unit weight was 7.9 kJ/kg, and although these were both more than those in the first comparative example, they were not as much as those in the first to seventh invention examples.

In each of the fifth comparative example, sixth comparative example, and seventh comparative example, a test specimen 31 (FIG. 4) which had the same shape as the test specimen 31 according to the second invention example and in which the type of the resin or at least one of the tensile breaking elongation, adhesive strength, and compression nominal stress of the resin was outside the range of the present invention was used. The absorbed energy and absorbed energy per unit weight in each of the fifth, sixth, and seventh comparative examples were not as much as those in the first to seventh invention examples.

It has been disclosed above that a crashworthiness energy absorption part for automotive according to the present invention enables collision energy absorption performance to be improved in a case where a crashworthiness load is input in the axial direction and axis crush deformation occurs.

INDUSTRIAL APPLICABILITY

The present invention enables provision of a crashworthiness energy absorption part for automotive, the crashworthiness energy absorption part being, for example, a front side member or a crash box and enabling improvement of the collision energy absorption effect upon input of a crashworthiness load from the front or back of the automotive body and axis crush deformation of the crashworthiness energy absorption part in the form of bellows.

REFERENCE SIGNS LIST

1 CRASHWORTHINESS ENERGY ABSORPTION PART FOR AUTOMOTIVE
3 TUBULAR MEMBER
5 OUTER PART
5a TOP PORTION
5b SIDE WALL PORTION
5c FLANGE PORTION
7 INNER PART
9 CLOSED CROSS SECTION SPACE FORMING WALL PART
11 RESIN
21 TEST PIECE
23 ADHEREND
25 ADHEREND
27 RESIN
31 TEST SPECIMEN
33 TEST SPECIMEN

The invention claimed is:

1. A crashworthiness energy absorption part for automotive, the crashworthiness energy absorption part being provided at a front or a back of an automotive body and being for absorbing collision energy by undergoing axial crush deformation in a longitudinal direction of the automotive body when a crashworthiness load is input from the front or the back of the automotive body, the crashworthiness energy absorption part comprising:

a tubular member formed of a steel sheet having tensile strength of 590 to 1180 MPa grade, the tubular member including a top portion and a pair of side wall portions continuous with the top portion, the tubular member being configured to undergo repeated buckling in a form of bellows;

a closed cross section space forming wall part formed of a steel sheet having tensile strength lower than the tubular member and provided to extend over the top portion inside the tubular member, the closed cross section space forming wall part having edge portions joined to inner surfaces of the pair of side wall portions, and forming a closed cross section space between the closed cross section space forming wall part and a part of a peripheral wall portion of the tubular member; and a resin configured to fill the closed cross section space, wherein the resin is arranged and configured to be deformed in response to the axial crush deformation of the tubular member, the resin includes a rubber-modified epoxy resin and a curing agent, and the resin has tensile breaking elongation of 80% or more, adhesive strength to the tubular member and closed cross section space forming wall part of 12 MPa or higher, and a compression nominal stress of 6 MPa or higher at a compression nominal strain of 10%.

2. A crashworthiness energy absorption part for automotive, the crashworthiness energy absorption part being provided at a front or a back of an automotive body and being for absorbing collision energy by undergoing axial crush deformation in a longitudinal direction of the automotive body when a crashworthiness load is input from the front or the back of the automotive body, the crashworthiness energy absorption part comprising:

a tubular member formed of a steel sheet having tensile strength of 590 to 1180 MPa grade, the tubular member including a top portion and a pair of side wall portions continuous with the top portion, the tubular member being configured to undergo repeated buckling in a form of bellows;

a closed cross section space forming wall part formed of a steel sheet having tensile strength lower than the tubular member and provided to extend over the top portion inside the tubular member, the closed cross section space forming wall part having edge portions joined to inner surfaces of the pair of side wall portions, and forming a closed cross section space between the closed cross section space forming wall part and a part of a peripheral wall portion of the tubular member; and a resin configured to fill the closed cross section space, wherein the resin is arranged and configured to be deformed in response to the axial crush deformation of the tubular member, the resin includes a rubber-modified epoxy resin, and the resin has tensile breaking elongation of 80% or more, adhesive strength to the tubular member and closed cross section space forming wall part of 12 MPa or higher, and a compression nominal stress of 6 MPa or higher at a compression nominal strain of 10%.

* * * * *